US 9,777,779 B2

(12) United States Patent
Cousins et al.

(10) Patent No.: US 9,777,779 B2
(45) Date of Patent: Oct. 3, 2017

(54) SYNCHRONIZER HAVING ASYMMETRIC BLOCKER AND SLEEVE TEETH (71) Applicant: GM Global Technology Operations LLC, Detroit, MI (US)

(72) Inventors: William L. Cousins, Ortonville, MI (US); Kristopher Villegas, Warren, MI (US); Todd W. Rooney, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 15/012,434

(22) Filed: Feb. 1, 2016

(65) Prior Publication Data
US 2016/0273593 A1 Sep. 22, 2016

Related U.S. Application Data (60) Provisional application No. 62/134,257, filed on Mar. 17, 2015.

(51) Int. Cl.
*F16D 23/06* (2006.01)
(52) U.S. Cl.
CPC ...... *F16D 23/06* (2013.01); *F16D 2023/0631* (2013.01); *F16D 2023/0656* (2013.01); *F16D 2023/0668* (2013.01)
(58) Field of Classification Search
CPC .............. F16D 23/025; F16D 23/06; F16D 2023/0631; F16D 2023/0656; F16D 2023/0662; F16D 2023/0668
See application file for complete search history.

(56) References Cited

U.S. PATENT DOCUMENTS

| 1,997,056 | A |  | 4/1935 | Griswold |
| 3,419,121 | A |  | 12/1968 | Stott |
| 4,176,736 | A |  | 12/1979 | Richards et al. |
| 4,189,041 | A | * | 2/1980 | Muller ................ F16D 23/06 |
|  |  |  |  | 192/114 T |
| 4,445,602 | A |  | 5/1984 | Chana et al. |
| 4,727,968 | A |  | 3/1988 | Chana et al. |
| 4,782,929 | A |  | 11/1988 | Mueller et al. |
| 4,809,832 | A |  | 3/1989 | Inui et al. |
| 4,852,709 | A |  | 8/1989 | Fukuhara et al. |
| 5,769,198 | A |  | 6/1998 | Gluys et al. |
| 8,550,226 | B2 |  | 10/2013 | Falcone et al. |

FOREIGN PATENT DOCUMENTS

| CN | 104279307 A | 1/2015 |
| DE | 19755613 A1 | 6/1999 |
| DE | 102009007848 A1 | 8/2010 |
| DE | 102013213030 B3 | 11/2014 |
| EP | 933547 B1 | 4/2003 |

(Continued)

*Primary Examiner* — Richard Lorence (57) ABSTRACT

A synchronizer for a transmission of a motor vehicle is provided. The synchronizer includes a sleeve and a blocker ring. The sleeve includes sleeve spline teeth and advanced sleeve spline teeth. The blocker ring includes blocker spline teeth. The sleeve spline teeth and blocker spline teeth are each asymmetrical and have a blunt tip, a first angled side, and a second angled side. The first and second angled sides have different angular relationships to a longitudinal axis of the teeth.

18 Claims, 5 Drawing Sheets

(56) References Cited

FOREIGN PATENT DOCUMENTS

| FR | 2390633 | A1 |   | 12/1978 | | |
|----|---------|----|---|---------|---|---|
| FR | 2783294 | A1 |   | 3/2000  | | |
| JP | 7-190092 | A | * | 7/1995  | ............. | F16D 23/06 |
| JP | 8200397 | A |   | 8/1996  | | |
| JP | 9-273571 | A | * | 10/1997 | ............. | F16D 23/06 |

* cited by examiner

SYNCHRONIZER HAVING ASYMMETRIC BLOCKER AND SLEEVE TEETH

CROSS-REFERENCE TO RELATED APPLICATIONS

This application claims priority to Provisional U.S. Application No. 62/134,257 filed Mar. 17, 2015. The disclosure of the above application is incorporated herein by reference.

FIELD

The present disclosure relates to a synchronizer having asymmetric blocker teeth and sleeve teeth for a transmission and more particularly to a synchronizer having asymmetric, shallow angle blocker and sleeve teeth with advanced sleeve gear indexing teeth.

BACKGROUND

The statements in this section merely provide background information related to the present disclosure and may or may not constitute prior art.

A synchronizer, or dog clutch, is employed in automatic and manual transmissions to synchronize the speed of two components prior to engagement of those two components. Generally speaking, a synchronizer includes a sleeve and a blocker ring. The sleeve has a set of teeth and is rotationally fixed to a first component and is longitudinally translatable along an axis of rotation to engage a set of teeth located on a second component. Longitudinal movement of the sleeve toward the direction of the second component initially causes a frusto-conical surface of the blocker ring to engage a matching frusto-conical surface on the second component prior to engagement of the teeth. Engagement of these two surfaces is a clutching action which causes the second component to be speed synchronized with the blocker ring and sleeve and thus the first component. During this speed synchronization, the blocker ring acts as a torque transmitting member which prevents the alignment of the sleeve teeth with grooves or notches in the blocker ring. Once synchronization occurs, friction on the blocker ring is relieved and the blocker ring is free to rotate slightly relative to the sleeve. The sleeve teeth then engage blocker ring teeth thus rotating the blocker ring and bringing into alignment the grooves or notches with the sleeve teeth. As the sleeve continues to move longitudinally, the sleeve teeth pass through the grooves or notches and engage and index with the teeth on the second component. At full engagement or full stop of the sleeve, the first component, the synchronizer, and the second component all rotate together.

However, as the sleeve pushes past the blocker ring after synchronization but before gear indexing, drag on the blocker ring can increase the rotational torque acting on the blocker ring. Thus, as the sleeve teeth engage the blocker ring teeth to move past the blocker ring, any increased rotational torque acting on the blocker ring increases the axial force, or blocker release load, required to push the sleeve past the blocker ring.

Typically, the teeth on the sleeve, blocker ring, and on the second component include oblique surfaces which cooperate during engagement to prevent inadvertent disengagement and to reduce indexing loads and blocker release loads. Typically the teeth on the sleeve and the blocker ring have been shaped to have 45 degree angles. While these designs are robust to wear they result in relatively high blocker release loads. One solution is to simply reduce the surface angles relative to a longitudinal axis of the teeth, thus reducing the blocking release loads. However, this results in narrow teeth having relatively small cross-sections that are not robust to wear. Therefore, there is a need in the art to provide a synchronizer that is robust to wear, reduces blocker release loads, improves cold shift quality, overcomes sticky synchronizers, reduces transmission drag losses, and harmonizes upshift and downshifts.

SUMMARY

A synchronizer for a transmission of a motor vehicle is provided. The synchronizer includes a sleeve and a blocker ring. The sleeve has sleeve spline teeth and advanced sleeve spline teeth, the sleeve spline teeth each having a sleeve tooth tip and first and second sleeve tooth sides extending from the sleeve tooth tip, wherein the first sleeve tooth side is angled with respect to the sleeve tooth tip at a first angle, and the second sleeve tooth side is angled with respect to the sleeve tooth tip at a second angle. The blocker ring has blocker spline teeth configured to engage with the sleeve spline teeth.

In one aspect, the first angle is different than the second angle.

In another aspect, each of the blocker spline teeth have a blocker tooth tip and first and second blocker tooth sides extending from the blocker tooth tip, and wherein the first blocker tooth side is angled with respect to the blocker tooth tip at the first angle and the second blocker tooth side is angled with respect to the blocker tooth tip at the second angle.

In another aspect, the blocker spline teeth and the sleeve spline teeth each have a longitudinal axis and are asymmetrical about the longitudinal axis.

In another aspect, each of the sleeve tooth tips is blunt.

In another aspect, each of the blocker tooth tips is blunt.

In another aspect, the sleeve rotates about an axis of rotation, and the advanced sleeve spline teeth extend along the axis of rotation farther than the sleeve spline teeth.

In another aspect, the first angle is approximately equal to 40 degrees and the second angle is approximately equal to 50 degrees.

In another aspect, the first angle is approximately equal to 55 degrees and the second angle is approximately equal to 50 degrees.

In another aspect, the second sleeve tooth sides contact the second blocker tooth sides when the sleeve moves axially to engage the blocker ring.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
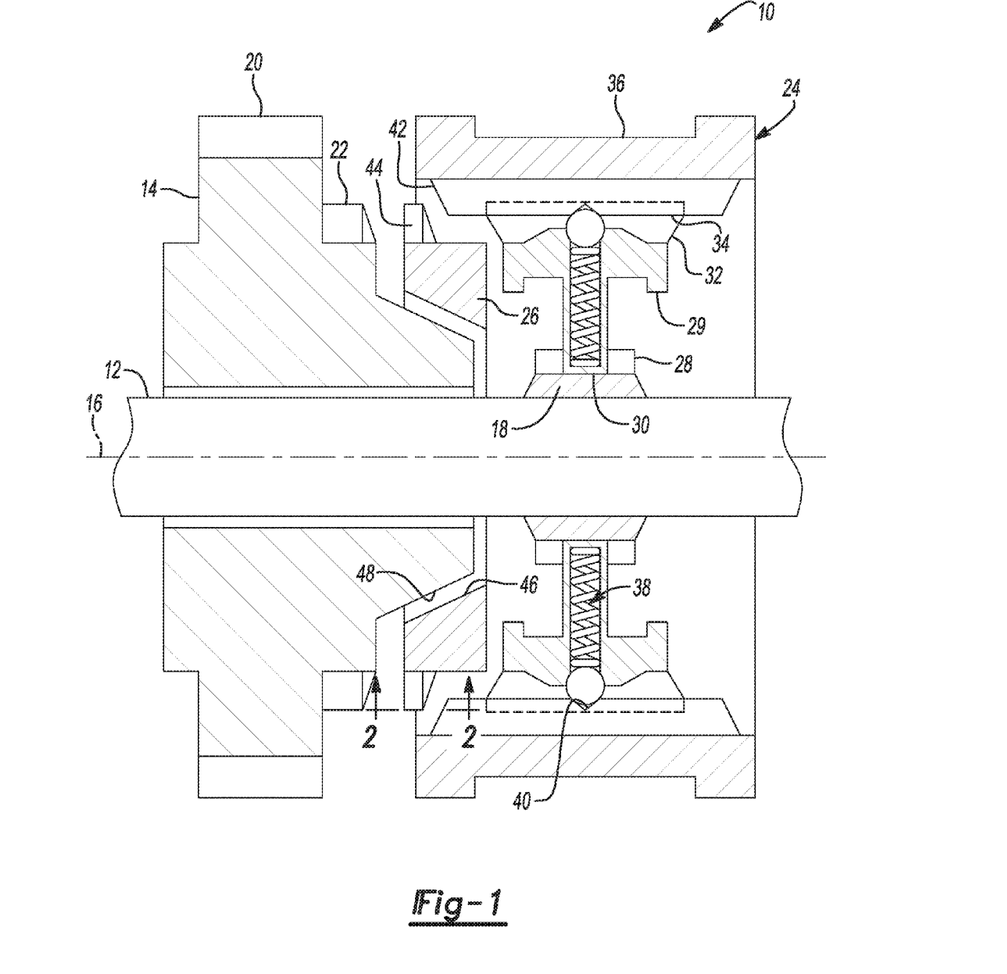
FIG. 1 is a cross-sectional view of a synchronizer according to the principles of the present invention.

With reference to FIG. 1, a synchronizer is illustrated and generally designated by reference number 10. The synchronizer 10 is preferably employed in a manual or automatic transmission of a motor vehicle (not shown). The synchronizer 10 is shown in operative engagement with a first component of the transmission, for example a shaft 12, and a second component of the transmission, for example a gear 14. It should be appreciated that the first and second components may be other members, such as combinations of gears or shafts or fixed members without departing from the scope of the present invention. The shaft 12 rotates about an axis of rotation 16 and includes a splined portion 18. The gear 14 is disposed concentric with the shaft 16 and rotates about the axis of rotation 16. The gear 14 includes external gear teeth 20 and gear spline teeth 22.

The synchronizer 10 is configured to synchronize the speed of the shaft 12 with the speed of the gear 14, or vice versa. The synchronizer 10 generally includes an annular sleeve 24 and a blocker ring 26. The sleeve 24 is concentric with the shaft 12 and rotates about the axis of rotation 16. A hub 28 rotationally couples the sleeve 24 to the shaft 12. The hub 28 includes internal splines 30 that are meshed with the spline portion 18 of the shaft 12 to connect the strut 28 for common rotation with the shaft 12. The hub 28 further includes external splines 32 that mate with internal splines 34 on the sleeve 24. A strut 29 is connected to the sleeve 24 and hub 28 and is configured to index the blocker ring 26 prior to the sleeve 24 contacting the blocker ring 26. The sleeve 24 is splined for common rotation with the hub 28, but is configured to be selectively axially movable, i.e. translatable longitudinally along the axis of rotation 16, relative to the shaft 12 and the strut 29 by actuation of a shift fork (not shown) that engages a recess or groove 36 of the sleeve 24. Likewise, the strut 29 is capable of axial movement relative to the shaft 12. Biasing elements 38 are spaced peripherally about the strut 29 and are biased into detents 40 of the sleeve 24. The biasing elements 38 may have various configurations, such as a ball and spring, without departing from the scope of the present invention. The biasing elements 38 and detents 40 cooperate to establish a neutral position of the sleeve 24 and the synchronizer 10. The shift fork is coupled to an axially translatable shift linkage (not shown) which may be translated by the vehicle operator out of the neutral position against the bias of the biasing element 38 to an engaged position. The sleeve 24 includes sleeve spline teeth 42 that are configured to mate with the gear spline teeth 22 of the gear 14 when the sleeve 24 is in the engaged position, as will be described in greater detail below.

The blocker ring 26 is disposed axially between the sleeve 24 and the gear 14. The blocker ring 26 includes blocker ring teeth 44 formed along an outer periphery of the blocker ring 26. The blocker ring 26 also includes a frusto-conical surface 46 which is configured to frictionally engage a frusto-conical surface 48 formed on the gear 14. The frictional clutching engagement of these surfaces 46 and 48 occurs during lateral movement of the sleeve 24 toward the gear 14, as will be described in greater detail below.

Figure 2:
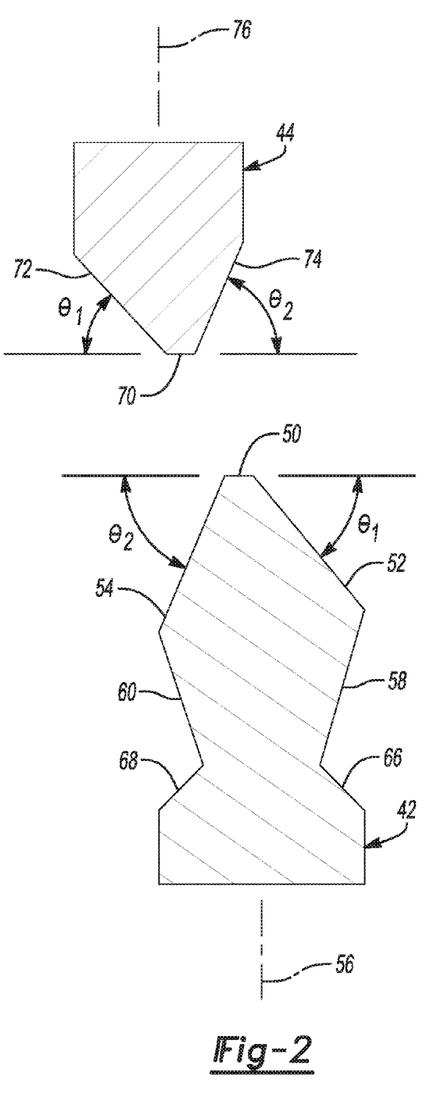
FIG. 2 is a cross-section taken in the direction of arrow 2-2 shown in FIG. 1.

Turning now to FIG. 2, an exemplary one of the sleeve spline teeth 42 and an exemplary one of the blocker spline teeth 44 is illustrated. The sleeve spline teeth 42 include a flat tip surface 50 that transitions to a first leading divergent surface or first sleeve tooth side 52 and a second leading divergent surface or second sleeve tooth side 54. The flat tip surface 50 is perpendicular to a longitudinal axis 56 of the sleeve spline teeth 42. The first divergent surface 52 is angled with respect to the flat tip surface 50 at a first angle theta1. The second divergent surface 54 is angled with respect to the flat tip surface 50 at a second angle theta2. In order to create an asymmetric profile about the longitudinal axis 56 and allow for upshift and downshift customization, theta1 does not equal theta2. In one example, theta1 is equal to 40 degrees while theta2 is equal to 50 degrees. In another example, theta1 is equal to 55 degrees and theta2 is equal to 50 degrees. The first divergent surface 52 transitions to a first convergent surface 58 and the second divergent surface 54 transitions to a second convergent surface 60. The convergent surfaces 58, 60 have an asymmetrical angular relationship with the longitudinal axis 56 of the respective sleeve spline teeth 42. A pair of converging surfaces 62 and 64 formed on the gear spline teeth 22 (see FIG. 3) have the same angular relationship as the surfaces 58 and 60. These surfaces 58, 60 and 62, 64 frictionally oppose separation of the sleeve spline teeth 42 from the gear spline teeth 22 when fully engaged. The first converging surface 58 transitions to a first trailing divergent surface 66 and the second converging surface 60 transitions to a second trailing divergent surface 68.

The blocker spline teeth 44 include a flat tip surface 70 that transitions to a first leading divergent surface or first blocker tooth side 72 and a second leading divergent surface or second blocker tooth side 74. The flat tip surface 70 is perpendicular to a longitudinal axis 76 of the blocker spline teeth 44. The first divergent surface 72 is angled with respect to the flat tip surface 70 at the first angle theta1. The second divergent surface 74 is angled with respect to the flat tip surface 70 at the second angle theta2. Thus, the first divergent surface 72 of the blocker spline teeth 44 complements the first divergent surface 52 of the sleeve spline teeth 42 and the second divergent surface 74 of the blocker spline teeth 44 complements the second divergent surface 54 of the sleeve spline teeth 42.

Figure 3:
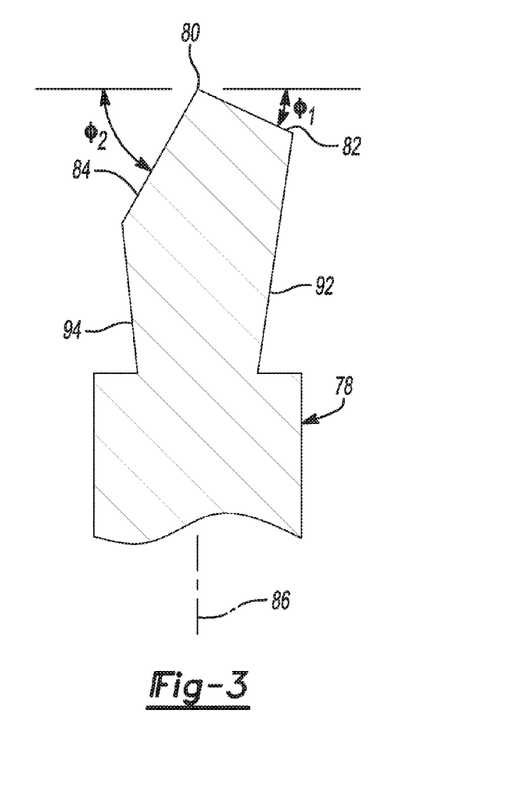
FIG. 3 is an enlarged cross-sectional view of a portion of the synchronizer.

With respect to FIG. 3, the sleeve 24 also includes a set of advanced sleeve spline teeth 78, one of which is shown. The advanced sleeve spline teeth 78 extend axially past, i.e. are advanced past, the sleeve spline teeth 42 (best seen in FIG. 4). The advanced sleeve spline teeth 78 do not engage the blocker spline teeth 44 but rather are used to index the sleeve spline teeth 42 with the gear spline teeth 22. The advanced sleeve spline teeth 78 have an apex 80 that transitions to a first leading divergent surface 82 and a second leading divergent surface 84. The first divergent surface 82 is angled with respect to an imaginary line perpendicular to a longitudinal axis 86 of the advanced sleeve spline teeth 78 at a first angle phi1. The second divergent surface 84 is angled with respect to the imaginary line at a second angle phi2. In order to create an asymmetric profile about the longitudinal axis 86, phi1 does not equal phi2. In one example, phi1 is equal to 25 degrees while phi2 is equal to 60 degrees. A pair of diverging surfaces 88 and 90 formed on the gear spline teeth 22 (see FIG. 4) have the same angular relationship as the surfaces 82 and 84. The first divergent surface 82 transitions to a first convergent surface 92 and the second divergent surface 84 transitions to a second convergent surface 94. The convergent surfaces 92, 94 have an asymmetrical angular relationship with the longitudinal axis 86 that matches the angular relationships of the surfaces 58, 60 and 62, 64 of the sleeve spline teeth 42 and the gear spline teeth 22, respectively.

Figures 4, 5:
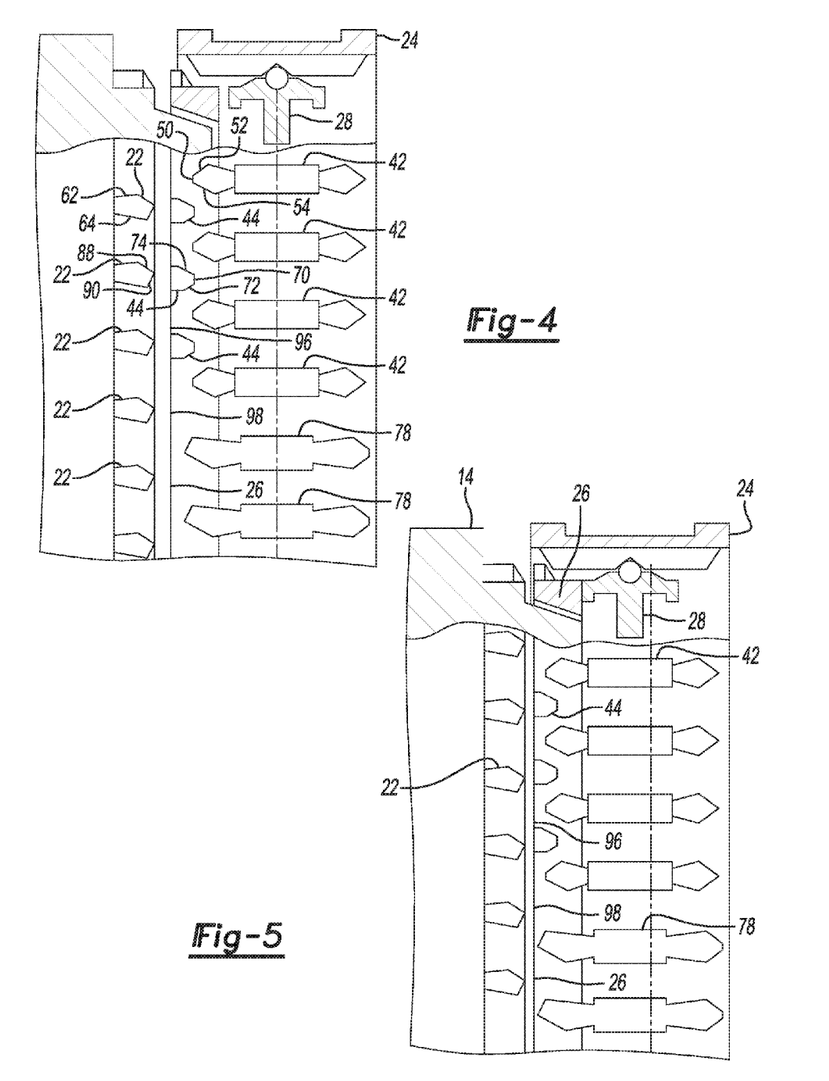
FIG. 4 is a plan, cross-sectional composite view of the synchronizer in a neutral position.
FIG. 5 is a plan, cross-sectional composite view of the synchronizer in a pre-synchronization position.

The operation of the synchronizer 10 in a downshift will now be described. In FIG. 4, the synchronizer 10 is shown in a neutral position where the blocker ring 26 is not engaged with the gear 14 and the sleeve spline teeth 42 are not extended through gaps 96 between the blocker spline teeth 44. Likewise, the advanced sleeve spline teeth 78 are not extended through a groove or gap 98 formed in the outer periphery of the blocker ring 26.

Longitudinal movement of the sleeve 24 in the direction of the gear 14 moves the strut 29 in the direction of the blocker 26. This produces axial movement of the blocker 26 towards the cone surface of the gear 14. The frusto-conical surface 46 of the blocker ring 26 engages the frusto-conical surface 48 of the gear 14 which indexes the blocker 26 during the pre-synchronization stage, shown in FIG. 5. Engagement of these two surfaces 46, 48 is a clutching action which causes the gear 14 to be speed synchronized with the shaft 12. Until speed synchronization occurs, the blocker ring 26 acts as a torque transmitting member which prevents the alignment of the sleeve spline teeth 42 with the gaps 96 between the blocker spline teeth 44.

Figures 6, 7:
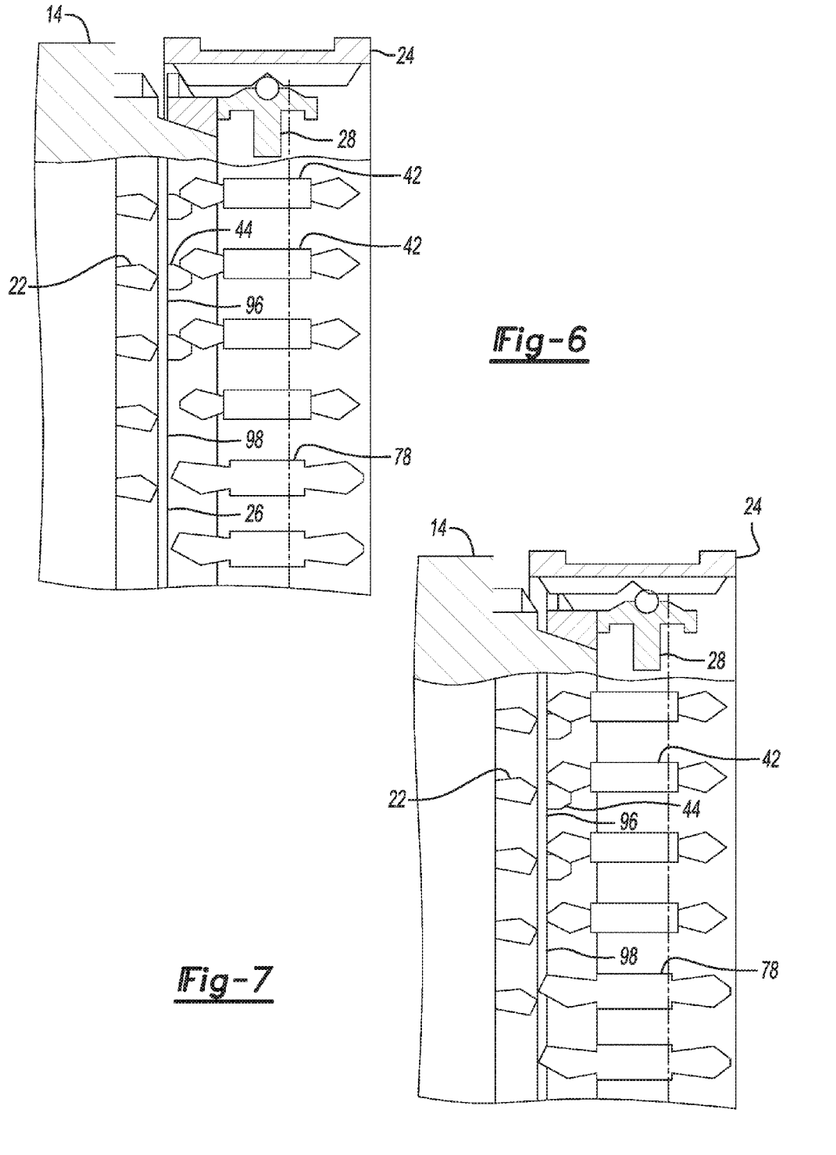
FIG. 6 is a plan, cross-sectional composite view of the synchronizer in a synchronizing position.
FIG. 7 is a plan, cross-sectional composite view of the synchronizer in a synchronized, blocker ring releasing position.

FIG. 6 shows the synchronizer 10 in a blocked state where the gear 14 and sleeve 24 are synchronizing. The leading diverging surfaces 52, 54 of the sleeve spline teeth 42 cooperate with diverging surfaces 72, 74 of the blocker spline teeth 44 to cause alignment of the blocker spline teeth 44 with spaces between the sleeve spline teeth 42.

FIG. 7 shows the synchronizer 10 in a synchronized state with the blocker ring 26 releasing. In the synchronized state, the rotational speed of the gear 14 has been matched with the shaft 12. When speed synchronization is attained, the blocker ring 26 discontinues any torque transmission and effectively disconnects the clutching action between the frusto-conical surfaces 46, 48 and is therefore free to rotate slightly relative to the sleeve 24. However, drag on the blocker ring 26 may increase the rotational torque acting on blocker spline teeth 44 and thus the sleeve spline teeth 42. The angle of the second leading divergent surface 54, theta2, is optimized to reduce the axial force required to move the sleeve 24 past the blocker ring 26 when drag creates rotational torque. The angle of the first leading divergent surface 52, theta1, assures that the sleeve spline teeth 42 have sufficient cross-sectional area to protect against wear. Likewise, the blunt flat tip surface 50 is robust to wear.

Figures 8, 9:
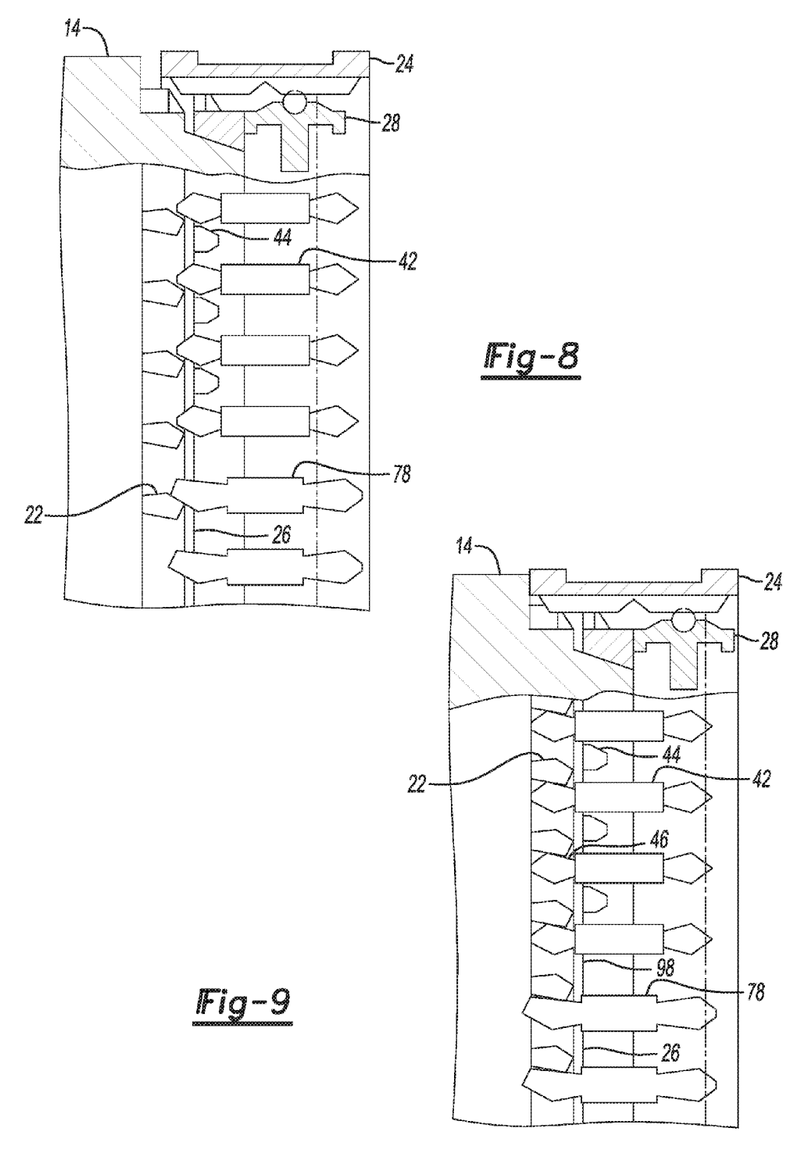
FIG. 8 is a plan, cross-sectional composite view of the synchronizer in a gear indexing position.
FIG. 9 is a plan, cross-sectional composite view of the synchronizer in a fully engaged position.

As the sleeve 24 continues to move longitudinally toward the gear 14, the sleeve spline teeth 42 move through the gaps 96 and the advanced sleeve spline teeth 78 engage the gear spline teeth 22, as shown in FIG. 8. The advanced sleeve spline teeth 78 index the sleeve 24 with respect to the gear 14.

FIG. 9 shows the synchronizer 10 in a fully engaged state. In the engaged state, the sleeve 24 ceases longitudinal movement and the sleeve spline teeth 42 are in meshing engagement with the gear spline teeth 22 with the surfaces between the teeth 16.

Reducing the blocker release loads on the synchronizer 10 improves the shift quality of the motor vehicle. In addition, during an upshift, the first divergent surfaces 52 of the sleeve spline teeth 42 engage the first divergent surfaces 72 of the blocker spline teeth 44. Thus, due to the asymmetric design of the blocker spline teeth 44 and the sleeve spline teeth 42, theta1 is optimized to reduce the upshift blocker release load. Therefore the synchronizer 10 is optimized for both downshifts and upshifts.

The description of the invention is merely exemplary in nature and variations that do not depart from the gist of the invention are intended to be within the scope of the invention. Such variations are not to be regarded as a departure from the spirit and scope of the invention.

The following is claimed:

1. A synchronizer for a transmission of a motor vehicle, the synchronizer comprising:
    a sleeve having sleeve spline teeth and advanced sleeve spline teeth, the sleeve spline teeth each having a sleeve tooth tip and first and second sleeve tooth sides extending from the sleeve tooth tip, wherein the first sleeve tooth side is angled with respect to the sleeve tooth tip at a first angle, the second sleeve tooth side is angled with respect to the sleeve tooth tip at a second angle and wherein each of the sleeve tooth tips is blunt; and
    a blocker ring having blocker spline teeth configured to engage with the sleeve spline teeth.

2. The synchronizer of claim 1 wherein the first angle is different than the second angle.

3. The synchronizer of claim 1 wherein each of the blocker spline teeth have a blocker tooth tip and first and second blocker tooth sides extending from the blocker tooth tip, and wherein the first blocker tooth side is angled with respect to the blocker tooth tip at the first angle and the second blocker tooth side is angled with respect to the blocker tooth tip at the second angle.

4. The synchronizer of claim 3 wherein the second sleeve tooth sides contact the second blocker tooth sides when the sleeve moves axially to engage the blocker ring.

5. The synchronizer of claim 1 wherein the blocker spline teeth and the sleeve spline teeth each have a longitudinal axis and are asymmetrical about the longitudinal axis.

6. The synchronizer of claim 1 wherein each of the blocker spline teeth has a blunt tip.

7. The synchronizer of claim 1 wherein the sleeve rotates about an axis of rotation, and the advanced sleeve spline teeth extend along the axis of rotation farther than the sleeve spline teeth.

8. The synchronizer of claim 1 wherein the first angle is approximately equal to 40 degrees and the second angle is approximately equal to 50 degrees.

9. The synchronizer of claim 1 wherein the first angle is approximately equal to 55 degrees and the second angle is approximately equal to 50 degrees.

10. An assembly for a motor vehicle comprising:
    a shaft that defines an axis;
    a gear concentric to the axis;
    a sleeve connected for common rotation with the shaft and translatable along the axis, the sleeve having sleeve spline teeth and advanced sleeve spline teeth, wherein the sleeve spline teeth are each asymmetrical along a longitudinal line of each sleeve spline tooth; and
    a blocker ring disposed between the gear and the sleeve, the blocker ring having blocker spline teeth configured to engage with the sleeve spline teeth, wherein the blocker spline teeth are each asymmetrical along a longitudinal line of each blocker spline tooth, and wherein each of the blocker spline teeth include a blocker spline tooth tip that is blunt, wherein the sleeve spline teeth engage the blocker spline teeth when the sleeve is in a blocking position and the sleeve spline teeth engage the gear when in a synchronized position.

11. The assembly of claim 10 wherein during a pre-synchronization stage, longitudinal movement of the sleeve in the direction of the gear moves the blocker ring towards a cone surface on the gear and a frusto-conical surface on the blocker ring engages the cone surface of the gear which indexes the blocker ring.

12. The assembly of claim 10 wherein the sleeve spline teeth each have a sleeve tooth tip and first and second sleeve tooth sides extending from the sleeve tooth tip, wherein the first sleeve tooth side is angled with respect to the sleeve tooth tip at a first angle, and the second sleeve tooth side is angled with respect to the sleeve tooth tip at a second angle.

13. The assembly of claim 12 wherein each of the blocker spline teeth have first and second blocker tooth sides extending from the blocker tooth tip, and wherein the first blocker tooth side is angled with respect to the blocker tooth tip at the first angle and the second blocker tooth side is angled with respect to the blocker tooth tip at the second angle.

14. The assembly of claim 13 wherein the first angle is different than the second angle.

15. The assembly of claim 10 further comprising a hub splined to the shaft, a strut connected to the hub and splined to the sleeve, and bias elements and detents to bias the sleeve to a neutral position.

16. A synchronizer for a transmission of a motor vehicle, the synchronizer comprising:

a sleeve having sleeve spline teeth and advanced sleeve spline teeth, the sleeve spline teeth each having a sleeve tooth tip and first and second sleeve tooth sides extending from the sleeve tooth tip, wherein the first sleeve tooth side is angled with respect to the sleeve tooth tip at a first angle, and the second sleeve tooth side is angled with respect to the sleeve tooth tip at a second angle, and wherein each of the sleeve tooth tips is flat and perpendicular to a longitudinal axis of each tooth; and a blocker ring having blocker spline teeth configured to engage with the sleeve spline teeth, each of the blocker spline teeth having a blocker tooth tip and first and second blocker tooth sides extending from the blocker tooth tip, and wherein the first blocker tooth side is angled with respect to the blocker tooth tip at the first angle and the second blocker tooth side is angled with respect to the blocker tooth tip at the second angle, and each of the blocker tooth tips is flat and perpendicular to a longitudinal axis of each tooth, wherein the first angle is different than the second angle.

17. The synchronizer of claim 16 wherein the sleeve rotates about an axis of rotation, and the advanced sleeve spline teeth extend along the axis of rotation farther than the sleeve spline teeth.

18. The synchronizer of claim 17 wherein each of the advanced spline teeth have a first divergent surface that connects to a second divergent surface at an apex, and the first divergent surface is angled with respect to a longitudinal axis of the advanced spline tooth at a third angle, the second divergent surface is angled with respect to the longitudinal axis of the advanced spline tooth at a fourth angle, and wherein the third angle does not equal the fourth angle.

* * * * *